United States Patent
Tanaka et al.

(10) Patent No.: US 7,408,571 B2
(45) Date of Patent: Aug. 5, 2008

(54) DIGITAL CAMERA AND IMAGE DATA PROCESSING SYSTEM

(75) Inventors: Hiroshi Tanaka, Saitama-ken (JP); Hitoshi Koike, Saitama-ken (JP)

(73) Assignee: Fujifilm Corporation, Tokyo (JP)

( * ) Notice: Subject to any disclaimer, the term of this patent is extended or adjusted under 35 U.S.C. 154(b) by 692 days.

(21) Appl. No.: 10/397,260

(22) Filed: Mar. 27, 2003

(65) Prior Publication Data

US 2003/0184652 A1 Oct. 2, 2003

(30) Foreign Application Priority Data

Mar. 28, 2002 (JP) ............................. 2002-091979

(51) Int. Cl.
| H04N 5/225 | (2006.01) |
| H04N 9/04 | (2006.01) |
| H04N 5/235 | (2006.01) |
| H04N 5/228 | (2006.01) |
| H04N 5/76 | (2006.01) |

(52) U.S. Cl. .............................. 348/207.1; 348/207.99; 348/207.11; 348/222.1; 348/231.99; 348/231.3; 348/231.6

(58) Field of Classification Search .............. 348/207.1, 348/207.11, 207.2, 207.99, 222.1, 231.99, 348/231.3, 231.6
See application file for complete search history.

(56) References Cited

U.S. PATENT DOCUMENTS

| 5,477,264 | A | * | 12/1995 | Sarbadhikari et al. ..... 348/231.6 |
| 5,606,365 | A | * | 2/1997 | Maurinus et al. ......... 348/222.1 |
| 5,867,214 | A | * | 2/1999 | Anderson et al. ........ 348/231.6 |
| 5,913,088 | A | * | 6/1999 | Moghadam et al. ......... 396/311 |
| 6,177,956 | B1 | * | 1/2001 | Anderson et al. ....... 348/207.99 |
| 6,215,517 | B1 | * | 4/2001 | Takahashi et al. .............. 348/72 |
| 6,414,714 | B1 | * | 7/2002 | Kurashige et al. ....... 348/207.99 |
| 6,535,243 | B1 | * | 3/2003 | Tullis ....................... 348/207.1 |
| 6,567,119 | B1 | * | 5/2003 | Parulski et al. ........... 348/207.2 |
| 6,714,204 | B2 | * | 3/2004 | Ishida et al. ................. 345/522 |
| 6,762,791 | B1 | * | 7/2004 | Schuetzle ................ 348/231.3 |
| 6,833,862 | B1 | * | 12/2004 | Li .......................... 348/207.99 |
| 6,952,223 | B2 | * | 10/2005 | Terashita ................. 348/222.1 |

(Continued)

FOREIGN PATENT DOCUMENTS

JP 06-090435 3/1994

(Continued)

OTHER PUBLICATIONS

Notice of Reasons for Rejection dated Mar. 22, 2006, with English translation.

*Primary Examiner*—Nhan T Tran
*Assistant Examiner*—Richard M Bemben
(74) *Attorney, Agent, or Firm*—McGinn IP Law Group, PLLC

(57) ABSTRACT

The present invention provides a digital camera and an image data processing system, which can develop and observe images recorded by both a compressed image recording control function and a raw image recording function on an external image processing device regardless of the presence/absence of a raw image reproducing function. When an image of CCD-raw data is reproduced on a PC, a self-development execution module is added to an image file to make it possible to perform reproduction such as display of the data on the monitor of the PC without arranging a dedicated viewer for reproducing CCD-raw data on the PC.

15 Claims, 9 Drawing Sheets

U.S. PATENT DOCUMENTS

| | | | |
|---|---|---|---|
| 6,968,118 B1 * | 11/2005 | Yamagishi et al. | 386/107 |
| 6,980,241 B2 * | 12/2005 | Aruga et al. | 348/241 |
| 6,995,794 B2 * | 2/2006 | Hsu et al. | 348/241 |
| 7,110,026 B2 * | 9/2006 | Feldis, III | 348/231.6 |
| 2002/0039139 A1 * | 4/2002 | Hsu et al. | 348/241 |
| 2003/0007078 A1 * | 1/2003 | Feldis, III | 348/231.6 |
| 2005/0162531 A1 * | 7/2005 | Hsu et al. | 348/222.1 |

FOREIGN PATENT DOCUMENTS

| | | |
|---|---|---|
| JP | 10-164490 | 6/1998 |
| JP | 11-261933 | 9/1999 |
| JP | 2001-223979 | 8/2001 |
| JP | 2001-352515 | 12/2001 |

* cited by examiner

F I G . 2
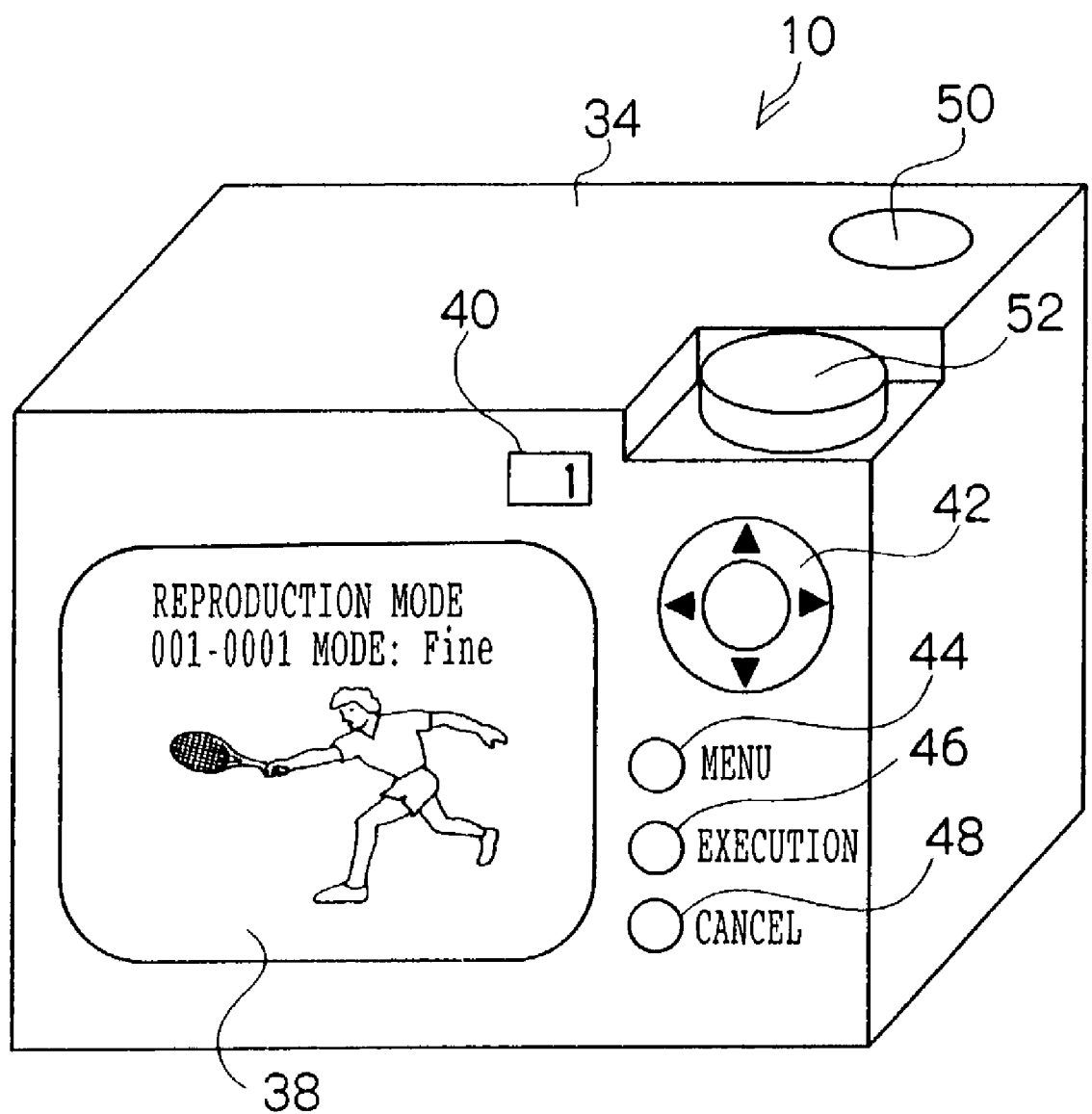

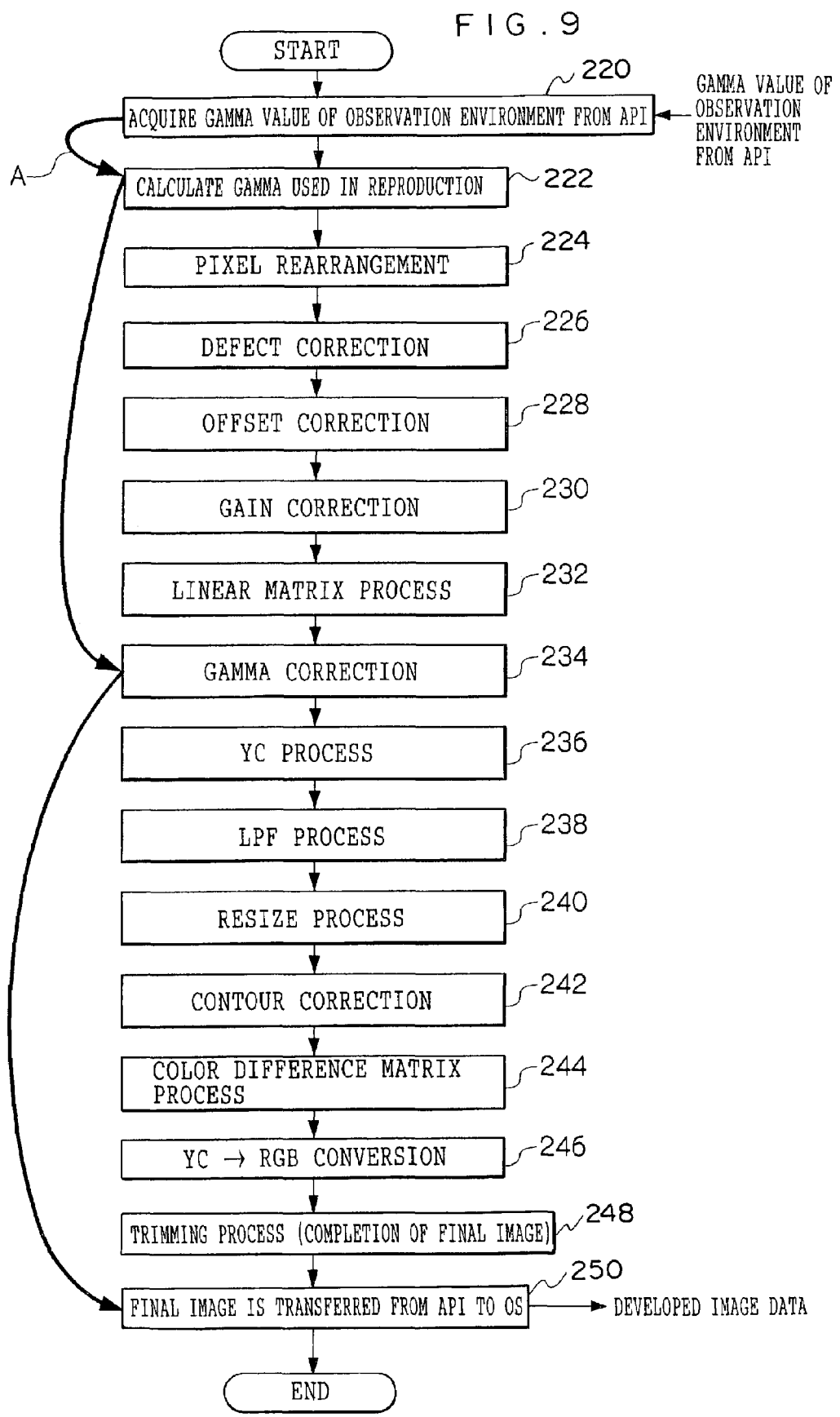

DIGITAL CAMERA AND IMAGE DATA PROCESSING SYSTEM

BACKGROUND OF THE INVENTION

1. Field of the Invention

The present invention relates to a digital camera and an image data processing system comprising an image pickup function, which picks up an image with a solid-state image pickup device and performs photoelectric transfer to obtain analog image data, and a digital image data recording function which converts the analog image data to form digital image data and records the data on a recording medium.

2. Description of the Related Art

In conventional digital cameras, when a still image or the like is picked up with a Charged Coupled Device (CCD), after the image data is converted from analog to digital, it is compressed with a predetermined compression format (e.g., JPEG), recorded, and stored in a recording medium such as a memory card.

The compressed and stored image data (hereinafter referred to as "JPEG data") is decompressed and displayed when reproducing the data onto the liquid-crystal monitor on the digital camera. When an index image or the like is displayed, a thumbnail image is prepared independently of the JPEG compressed image. This thumbnail image is read out to shorten the read-out process time.

Digital cameras can be easily connected to an external control device (e.g., personal computer) so that image data recorded on a recording medium can be transferred thereto, subjected to various processes, and then printed out. Hence, digital cameras have become increasingly popular in recent years.

In particular, images photographed with a digital camera are often applied to business purposes. For professional uses, when a high-quality photographed image is compressed once, depending on the compression rates, the image quality or the like of the compressed image may be lower than that of the originally obtained photographed image data.

Therefore, conventional technology proposes a digital camera having a raw image recording control function, in addition to the compressed image recording control function. That is, a photographed image is recorded as raw image data (hereinafter referred to as CCD-raw data) on a recording medium so that the CCD-raw data is transferable to a personal computer (see Japanese Patent Application Laid-Open (JP-A) Nos. 6-90435 and 11-261933).

As disclosed in the above conventional technology, unlike normal JPEG data, CCD-raw data is not subjected to necessary processes to reproduce and display the data on the liquid-crystal monitor of the digital camera. For this reason, interpolation automatic exposure (AE), automatic white balance (AWB), gamma adjustment, and the like must be performed when reproducing the CCD-raw data. For this reason, such digital cameras must be equipped with a function that enables execution of a reproduction process of the CCD-raw data.

When a CCD-raw data reproducing process function is arranged in the digital camera in advance, the data can be reproduced and displayed on the liquid-crystal monitor.

However, the CCD-raw data is generated on the assumption that it will be transferred to an external image processing device such as a personal computer and processed therein, and then recorded onto a recording medium. In order to reproduce and display such CCD-raw data, dedicated application software (hereinafter referred to as a "dedicated viewer") must be installed in the personal computer. However, since CCD-raw data is for professional and not general use, it has poor versatility and further, not all personal computers possess dedicated viewers for the CCD-raw data.

For this reason, the conventional technology is problematic in that when a photographing operation is erroneously performed in a CCD-raw mode, there are cases where the obtained CCD-raw data cannot be reproduced on a personal computer.

SUMMARY OF THE INVENTION

The present invention is made in consideration of the above circumstances, and has as its objective to provide a digital camera and an image data processing system that can reliably develop and observe images, recorded by both a compressed image recording control function and a raw image recording control function on an external image processing device, regardless of the presence or absence of a raw image reproducing function.

A first aspect of the invention provides a digital camera having an image pickup function, which performs an image pickup operation using a solid-state image pickup device and performs photoelectric conversion to obtain analog image data, and a digital image data recording function, which converts the analog image data to form digital image data and records the digital image data on a recording medium, comprising: a raw image recording control component for recording the digital image data on the recording medium as unprocessed raw image data; and a self-development execution module adding component for adding a self-development execution module for developing the raw image data to the raw image data or to the recording medium on which the raw image data is recorded.

According to the first aspect of the invention, for example, when the raw image data is transmitted to an external control device (e.g., a personal computer) through the recording medium, the self-development execution module for self-developing a raw image is added to the raw image data or the recording medium by the self-development execution module adding component and then transmitted. For this reason, the raw image data can be developed in the external control device without arranging a dedicated viewer for developing the raw image data.

In the first aspect of the invention, the self-development execution module adding component may further add an observing condition when the raw image data is observed and transmit the image.

The raw image data developed in the external control device can observe an image without changing the raw image data. However, in this case, image processing is preferably performed according to the observing condition. For example, when tone is taken as one of the observing conditions, the difference between tone expressions (for example, the tone of raw image data is 12-bit tone, and tone which can be expressed on the external control device side is 8-bit tone) forms a toneless image that seriously affects image quality.

Therefore, when a self-development execution module is added to raw image data by the self-development execution module adding component, the raw image data is added with observing conditions such as the tone and transmitted, so that an image can be appropriately expressed (reproduced) under an environment on the external control device side.

Further, the digital camera may include a self-development execution module that executes image processing for raw image data. The self-development execution module may be independent of the external control device, which develops image data.

A second aspect of the invention provides an image data processing system comprising: a digital camera having a normal image data recording mode which converts image data of an object photographed using a solid-state image pickup device from analog to digital, performs a process such as compression to the digital data, and records the resultant data on a recording medium, and a raw image data recording mode, which directly records the raw image data obtained by the analog-digital conversion on the recording medium and adds a self-development execution module for developing the raw image data when the raw image data is recorded on the recording medium; and an external process control device, which has an application programming interface for delivering an observing condition used when the raw image data is observed and delivering raw image data developed by the self-development execution module, and which is further capable of communicating with the digital camera.

According to the second aspect of the invention, data recorded in both the normal image data recording mode and the raw image data recording mode exist in the digital camera, and these data are transmitted to the external process control device without differentiating the data. In this case, since the self-development execution module is added to the raw image data, the raw image data can be developed without arranging a dedicated viewer in the external process control device.

At this time, the external control device has an application programming interface (API) to deliver an observing condition used when raw image data, represented by tone of raw image data, is observed, and to deliver raw image data developed by the self-development execution module. Therefore, even if the tone of the raw image data is different from the tone of the raw image data developed by the external process control device, the difference is interpolated to make it possible to observe the raw image data on the basis of the desired observing conditions.

The image data processing system may possess the self-development execution module, which executes image processing of raw image data. The self-development execution module may be independent of the external control device, which develops image data.

According to the third embodiment of the present invention, the external control device, which displays image data picked up with a digital camera, further comprises an application programming interface, which transfers an observing condition when raw image data is observed between the digital camera and the external control device and transfers raw image data after it has been developed by the self-development execution module between the digital camera and the external control device, wherein the raw image data is image data of an object picked up with a solid-state image pickup device of the digital camera and which has only been converted from analog to digital; and the self-development execution module is added to the raw image data for developing raw image data.

The digital camera further may add reproduction parameters to the raw image data for reproducing the raw image data and the external control device may reproduce the raw image data based on the reproduction parameters.

The self-development execution module may be independent of the external control device. Further, the self-development execution module may execute image processing of raw image data.

A fourth embodiment of the present invention provides an image recording method comprising the steps of: converting data, which was picked up with a solid-state image pickup device of a digital camera, from analog to digital; recording, to a recording medium, which does not undergo any other processing; and recording a self-development execution module for developing raw image data to at least one of the raw image data and the recording medium having the raw image data recorded thereon.

In the image recording method, the self-development execution module may be independent of the external control device, which develops raw image data. The self-development execution module may execute image processing of the raw image data.

A fifth embodiment of the present invention provides an image control method, which controls an image that is recorded by the image recording method of the fourth embodiment, the method comprising the steps of: transferring the observing condition between the digital camera and the external control device; and transferring the developed raw image data, which is developed by the self-development execution module, between the digital camera and the external control device.

As described above, the invention has the following advantage. That is, images recorded by both a compressed image recording control function and a raw image recording control function can be reliably developed and observed on an external image processing device regardless of the presence/absence of a reproducing function of a raw image.

BRIEF DESCRIPTION OF THE DRAWINGS

FIG. 2 is a perspective view of the appearance of the digital camera when viewed from the rear side.

FIG. 9 is a control flow chart showing an execution code process routine.

DESCRIPTION OF THE PREFERRED EMBODIMENTS

Figure 1:
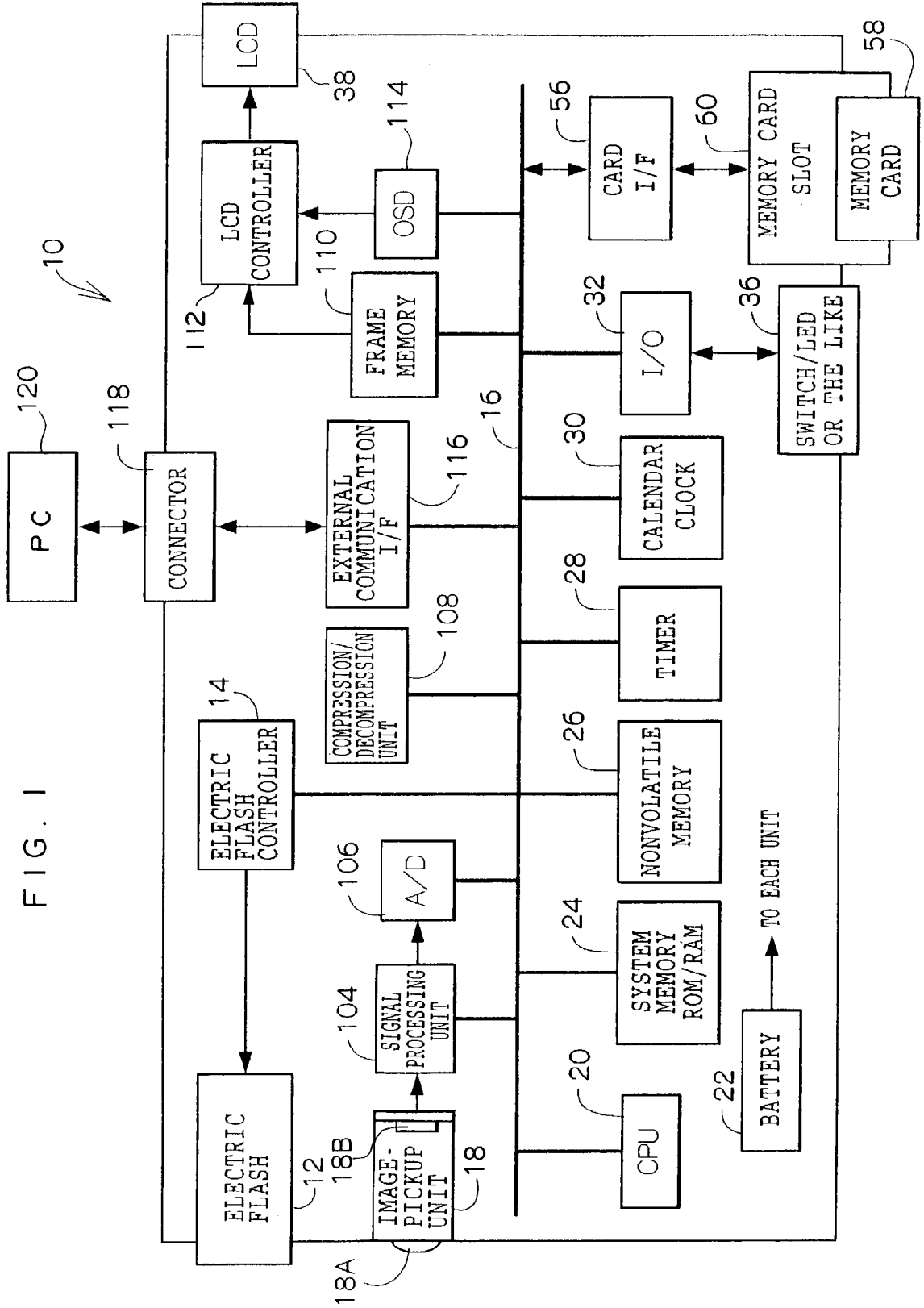
FIG. 1 is a control block diagram of a digital camera according to the embodiment of the present invention.

FIG. 1 shows a control system in a digital camera 10 according to an embodiment of the present invention. An image pickup unit 18 is arranged in the digital camera 10. The image pickup unit 18 has the following configuration. A lens 18A, a mechanical shutter, and a diaphragm are arranged such that incident light from the lens 18A is made incident on a CCD 18B through the diaphragm when the mechanical shutter is open.

An electric flash 12 is arranged on the digital camera 10 to manually or automatically flash under the control of an electric flash control unit 14 as needed.

The control devices including the image pickup unit 18 and the electric flash control unit 14 of the digital camera 10 are connected to each other by a bus 16. The operations of the devices are controlled by a CPU 20. A power from a battery 22 is supplied to the control devices to make it possible to operate the control devices.

A system memory (RAM or ROM) 24, a nonvolatile memory 26, a timer function unit 28, and a calendar/clock function unit 30 are connected to the bus 16 as control devices.

The I/O port 32, which is connected to the bus 16, is capable of inputting and outputting signals from an operation/display system 36 mounted to a housing 34 (see FIG. 2) of the digital camera 10.

As shown in FIG. 2, a liquid-crystal monitor (LCD) 38 are arranged on a rear surface side (on a side opposing the side on which the image pickup unit 18 is arranged) of the housing 34 of the digital camera 10. A frame number display unit 40 serving as a part of the operation/display system is arranged on the upper portion of the liquid-crystal monitor 38. For example, a photographing frame number is displayed by a 7-segment liquid-crystal display.

As the operation/display system, on the right side of the LCD 38 on the rear side of the housing 34, a circular four-direction key 42 provided for frame switching of images displayed on the LCD 38, item selection, and the like is arranged. When the axial line of the four-direction key 42 is inclined upward, downward, left, or right, different contacts of the switch are switched by inclining the four-direction key 42. In this manner, the switching signal is input to the I/O 32 (see FIG. 1).

On the lower portion of the four-direction key 42, a menu button 44, an execution button 46, and a cancel button 48 are vertically arranged downward. On the upper surface of the housing 34, a release button 50 and a mode setting dial 52 are arranged.

Figure 3:
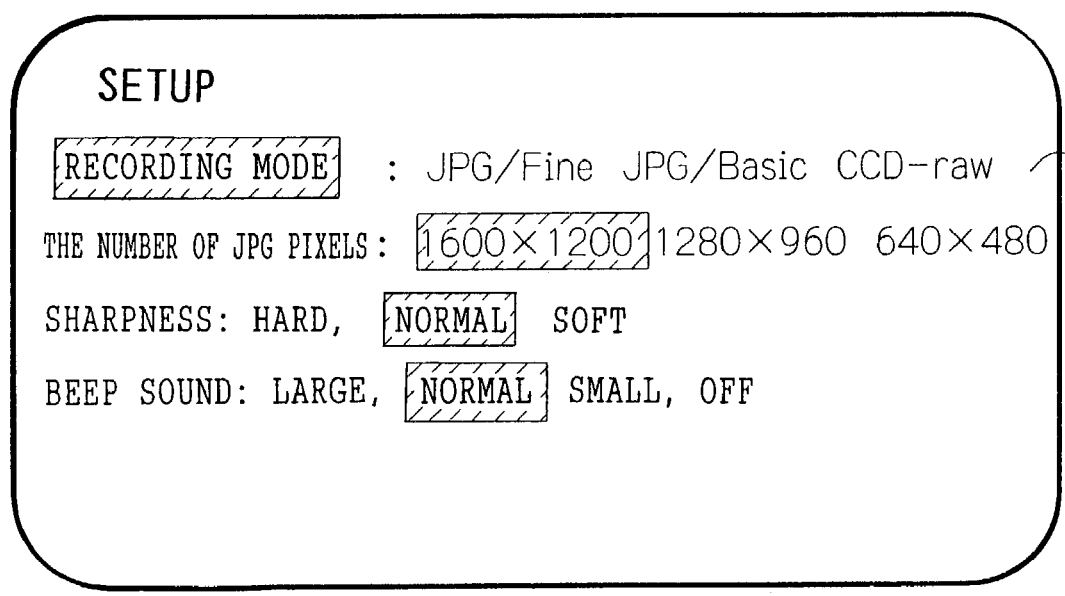
FIG. 3 is a front view of a setup screen displayed on an LCD mounted on the digital camera.

When the mode setting dial 52 and the menu button 44 are operated, for example, as shown in FIG. 3, a setup screen 54 for performing various settings are displayed on the LCD 38.

The execution button 46 is operated on the setup screen 54 after a function is selected and determined by the four-direction key 42, and the cancel button 48 is operated when the determined function is canceled.

As shown in FIG. 1, a memory card slot 60 to which a memory card 58 serving as a recording medium is detachably connected is connected to the bus 16 through an card I/F 56. Image data obtained by a photographing operation of the image pickup unit 18 is recorded on the memory card 58 loaded on the memory card slot 60.

In the embodiment, as a recording mode of image data on the memory card 58, a JPEG recording control function for recording JPEG data compressed by JPEG format and a CCD-raw recording control function for recording raw image data (CCD-raw data) which is not compressed are set.

Figure 4:
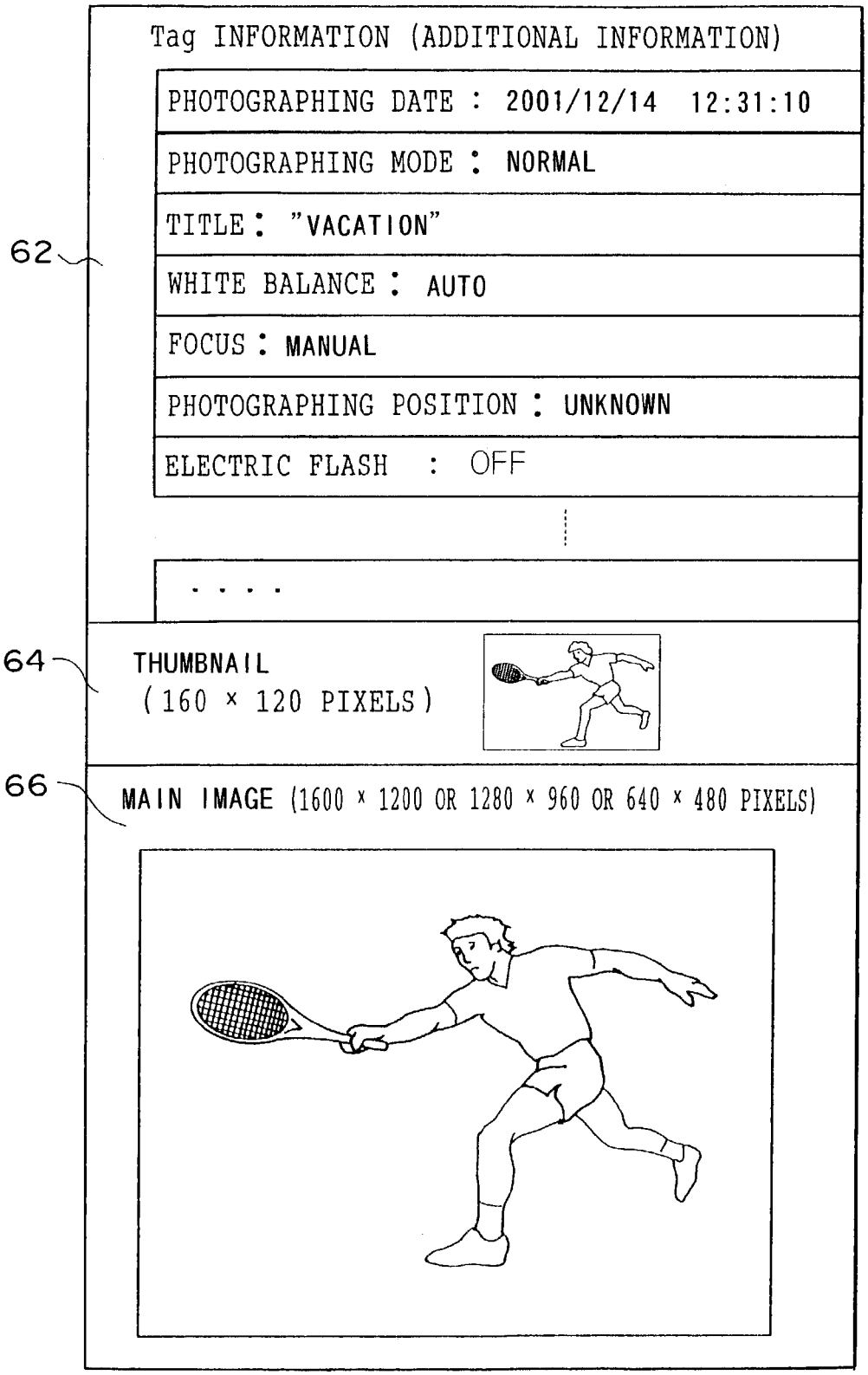
FIG. 4 is a pattern diagram showing a file structure of JPEG data.

The file structure recorded on the memory card 58 by the JPEG recording control function is, as shown in FIG. 4, classified into a Tag information region 62, a thumbnail region 64, and a main image region 66. Since the respective regions are the same as those of a general JPEG file structure, a detailed description thereof will be omitted.

Figure 5:
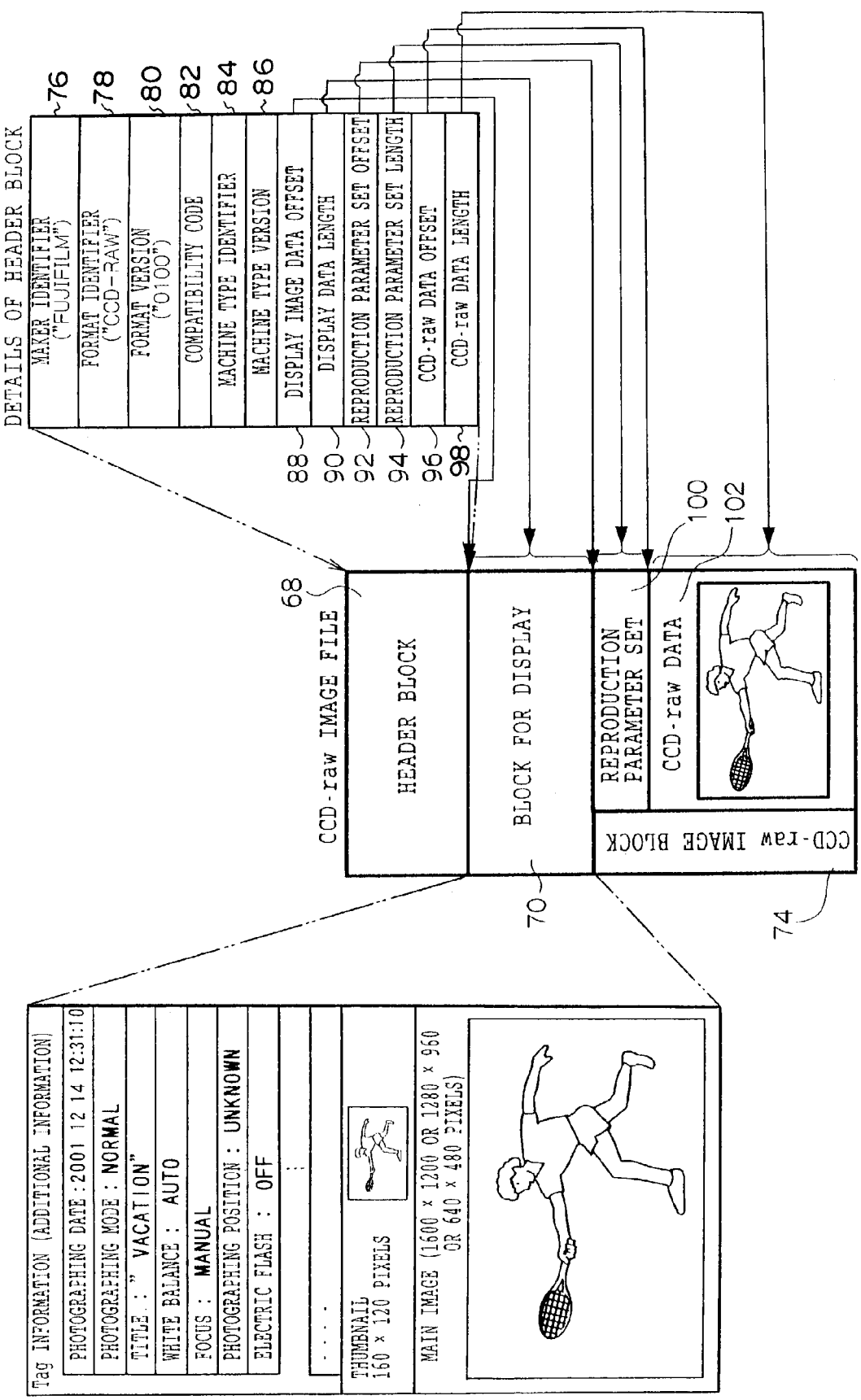
FIG. 5 is a pattern diagram showing a file structure of CCD-raw data.

In contrast, the file structure recorded on the memory card 58 by the CCD-raw recording control function is, as shown in FIG. 5, is classified into a header block region 68, a display image block region 70, and a CCD-raw image block region 74.

The header block region 68 is classified into a maker identifier storage section 76, a format identifier storage section 78, a format version storage section 80, a compatibility code storage section 82, a machine type identifier storage section 84, a machine type version storage section 86, a display data offset storage section 88, a display image data length storage section 90, a reproduction parameter offset storage section 92, a reproduction parameter set length storage section 94, a CCD-raw data offset storage section 96, and a CCD-raw data length storage section 98.

The JPEG file structure is directly stored in the display image block region 70. More specifically, when an image is to be reproduced and displayed on the LCD 38 of the digital camera 10, JPEG image data (in this case, VGA) or thumbnail image data stored in the display image block region 70 is read. The CCD-raw image block region 74 is classified into a reproduction parameter set storage section 100 and a CCD-raw data storage section 102. The image data stored in the CCD-raw data storage section 102 is raw image data obtained by a photographing operation.

Figure 6:
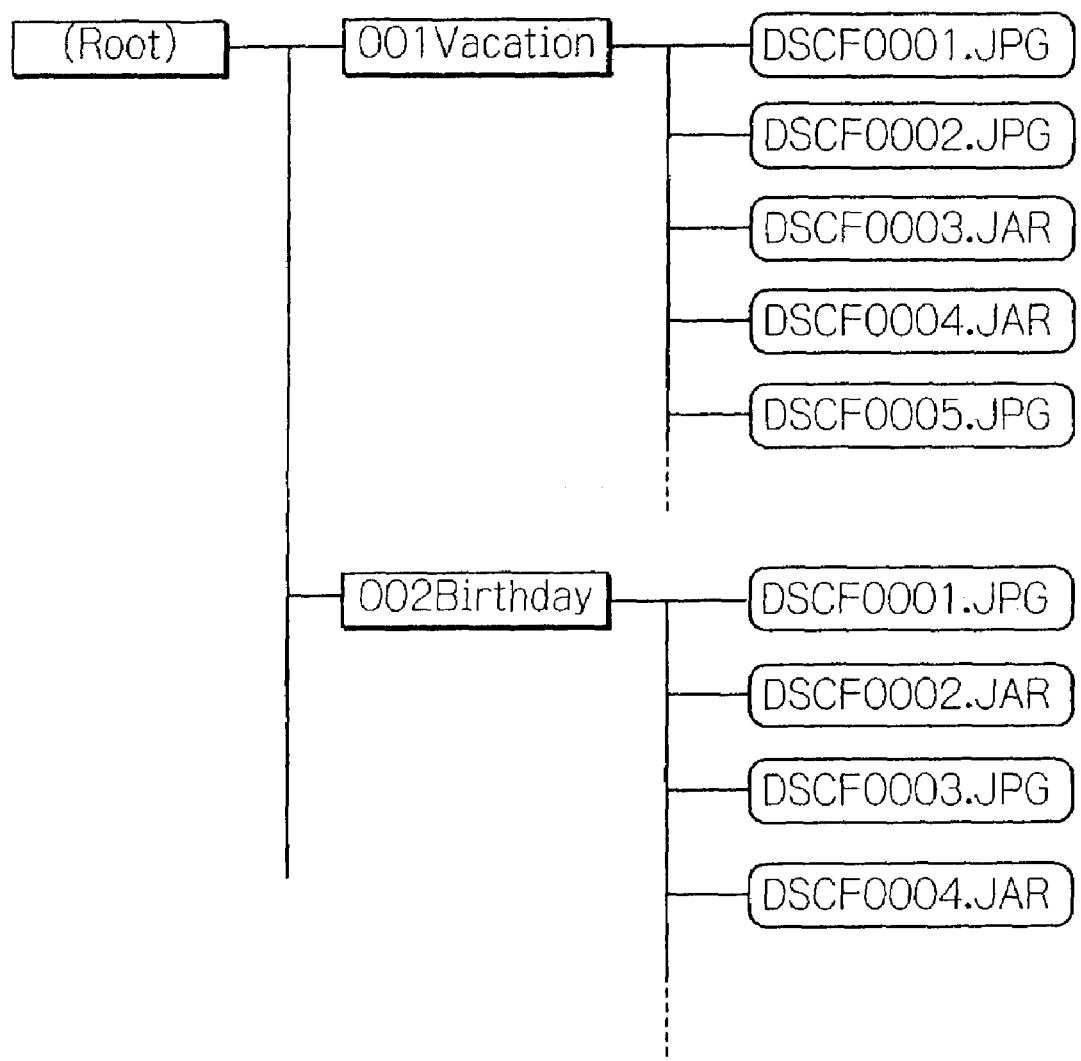
FIG. 6 is a diagram showing a tree structure of files in a PC.

The image data transferred to the digital camera 10 is, as shown in FIG. 6, classified into directories of plural types (001 Vacation, 002 Birthday, . . . ). For example, in the directory (001 Vacation), file serial numbers (0001, 0002, 0003, 0004, 0005, . . . ) are added to prefix "DSC" (DSC: digital still camera) as file names, and suffixes are added to the file serial numbers. The files are each classified by the suffixes, so that usability can be improved.

JPG and JAR are used as the suffixes. JPG represents compressed JPEG data. JAR represents CCD-raw data serving as raw image data.

In this case, the suffix JAR also expresses that the CCD-raw data is added with a self-development execution module.

In the self-development execution module, after the CCD-raw data is transmitted to a PC 120 (to be described later) through the memory card 58, a self-development execution program is started. The CCD-raw data is designed to be automatically converted into data of a general file format (in this case, bitmap data) and reproduced (displayed). An environment on the PC 120 for reproduction will be described later.

A signal input to the image pickup unit 18 is transmitted to a signal processing unit 104 and subjected to a noise reduction process and gain control. The resultant signal is transmitted to an A/D converter 106.

The image data A/D-converted by the A/D converter 106 is designed to be transmitted to a compression/decompression unit 108 when instructed to do so by the CPU 20, and subjected to a compression process (JPEG), or it is transmitted to the memory card slot 60 through the card I/F 56 without changing the state of the image data.

The image data recorded on the memory card 58 is read on the basis of a reproduction/display instruction from the CPU 20, stored in a frame memory 110, and displayed on the LCD 38 under the control of an LCD controller 112. At this time, on the LCD 38, an image display based on the image data, characters, character data, and the like controlled by an OSD (on-screen display unit) 114 are displayed such that they are superimposed on the image display.

An external communication I/F 116 is connected to the bus 16, so that the digital camera can be directly connected to an external control device (to be referred to as a PC 120 hereinafter) such as a personal computer through a connector 118. Image data recorded on the memory card 58 can be transmitted to the PC 120.

In general, in the PC 120, an image processing application software which can expand the data compressed in a compression format (in this case, JPEG format) used for recording the data on the memory card 58 when the image data recorded on the memory card 58 is taken into the PC and processed by the PC is installed. The JPEG format generally has high compatibility. For this reason, even in the digital camera 10, such a compression format having high compatibility is used.

In contrast to this, in the CCD-raw data recorded on the memory card 58 in a state (the data is not subjected to any process) immediately after the image is obtained by a photographing operation, since high compatibility cannot be obtained, an application software which can reproduce the CCD-raw data is rarely installed on the PC 120.

However, according to the embodiment, when the recording control function for CCD-raw data is used in the digital camera 10, as the suffix JAR of the image file, a self-development execution module is added together with CCD-raw. For this reason, the data can be reproduced in the PC 120 regardless of the presence/absence of application software which can reproduce CCD-raw data on the PC 120.

Figure 7:
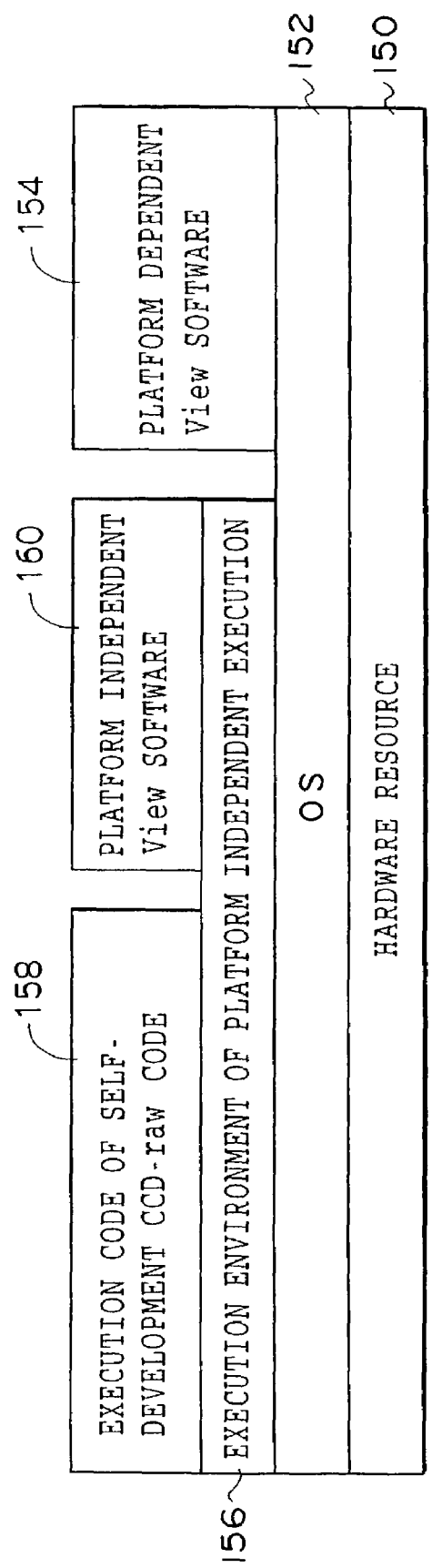
FIG. 7 is a pattern diagram of an image file reproducing environment structure structured on the PC.

FIG. 7 typically shows an image file reproducing environment structure in the PC 120. The PC 120 has a platform environment in which a hardware resource 150 is operated by a predetermined operating system (for example, Windows, Mac OS, or the like) 152 (to be referred to as an OS 152 hereinafter) An image data developing software (viewer) 154 is installed in the PC 120. This software is designed to operate depending on the platform (OS 152).

In this platform environment, a platform independent execution environment region 156 typified by JAVA or the like is formed. In the embodiment, an image file in which CCD-raw data is recorded operates by using the platform independent execution environment region 156 as a base (self-development region 158).

In place of the image data developing software (viewer) 154 of the JPEG or the like, an image data developing software (viewer) 160 of the JPEG or the like which operates by using the platform independent execution environment region 156 as a base may be formed.

The platform independent execution environment region 156 is provided with an API (Application Programming Interface) which receives an execution code (see FIG. 1) included in the self-development execution module and which sends image data developed on the basis of the execution code to the OS 152 in the image file of the CCD-raw data.

TABLE 1

| Process Block | Process Contents |
| --- | --- |
| Pixel Rearrangement | The specific arrangement of the format of CCD-raw data is returned to a spatial arrangement on a CCD surface. In a honeycomb structure, a checked imaginary image is input. |
| Defect Correction | When defect correction is not performed by CCD-raw or when an operator wants to perform high-level defect correction, defect correction is performed here. |
| Offset Correction | Subtraction for restoring a signal which is OB-clamped by an analog system. As a result, the signal is linear in luminance. |
| Gain Correction | A multiplying process for each RGB. White balance correction and brightness correction are performed here. |
| Linear Matrix | 3 × 3 matrix operation for RGB. In a present LSI, although the operation is performed by two variables before offset correction, it is theoretically better that the 3 × 3 matrix operation is performed after WB correction. |
| Gamma Correction | Gradation conversion using LUT. An LUT operation for flare correction is also performed depending on scenes. This process is performed to convert 12-bit data into 8-bit data. |
| YC process | Conversion into YCrCb signal is performed together with a synchronizing process. |
| LPF process | An LPF process for reducing a imaginary signal and noise reduction are performed. |
| Resize process | Resize using a pre-filter and bilinear conversion. |

TABLE 1-continued

| Process Block | Process Contents |
| --- | --- |
| Contour Correction | Contour correction process (filter, coring, gain, or the like) for emphasizing sharpness. |
| Color Difference Matrix | 2 × 2 matrix operation for CrCb. A diagonal term corresponds to a color difference gain. |
| YC-RGB Conversion | A predetermined matrix operation for converting a YCrCb signal into an RGB signal. |
| Trimming Process | Trimming for cutting green. As a result, a final image is obtained. |

In the platform independent execution environment region 156, the processes described in Table 1 are performed to image data which is developed by the self-development execution module and converted from CCD-raw data into bitmap data. The resultant data is transferred onto the OS 152.

An operation of the embodiment will be described below.

Before a photographing operation is performed by the digital camera 10, the mode setting dial 52 is operated to display the setup screen 54 on the LCD 38.

Photographing conditions are set on the setup screen. When a recording mode is selected (inversely displayed) by the four-direction key 42, and when the execution button 46 is operated, the recording mode can be selected. As the items of the recording mode, in FIG. 3, JPEG/FINE, JPEG/BASIC, and CCD-raw are displayed. A recording mode to be selected is selected (inversely displayed) by the four-direction key 42, and the execution button 46 is operated.

Similarly, items such as the number of pixels, sharpness, peep sound, and the like are selected as needed. The items are set, respectively.

In a photographing mode, a preview of an image obtained by a photographing operation of the image pickup unit 18 is displayed on the LCD 38. When a predetermined field angle is determined, the release button 50 is operated, and a photographing operation is executed.

In this case, the data picked by the image pickup unit 18 is transmitted to the signal processing unit 104 and subjected to processes such as a noise reduction process, a gain control process, and the like. Thereafter, the data is A/D-converted to generate digital image data.

Thereafter, the digital image data is compressed in the compression/decompression unit 108, and the compressed data is recorded on the memory card 58.

In a reproducing mode, when an index mode is selected, a thumbnail image is read from digital image data (JPEG file format) recorded on the memory card 58, and a photographed image is displayed in the form of a matrix on the LCD 38. When a 1-image reproducing mode is selected, compressed image data recorded in the JPEG file format is read and expanded in the compression/decompression unit 108. The image data is developed in the frame memory 110 and then displayed on the LCD 38.

As shown in FIG. 6, an image file (JPEG data) having an decompression of JPG and an image file (CCD-raw data) having an decompression of JAR exist in the memory card 58. In a conventional technique, the CCD-raw data cannot be reproduced in the PC 120 which has no dedicated viewer.

However, in the embodiment, CCD-raw data and a self-development execution module are added to the image file having an suffix of JAR. For this reason, when the image file having the decompression of JAR is selected on the PC 120, the image file is transferred to the PC 120 and self-developed on the platform of the PC 120 to obtain bitmap data. In this manner, a user of the digital camera 10 can transfer data to the PC 120 and reproduce the data regardless of the file format, and such a drawback that CCD-raw data cannot be reproduced can be solved.

In the embodiment, the self-development region 158 for self-development is formed in the platform independent execution environment region 156 on the platform of the PC 120. The platform independent execution environment region 156 is provided with an API (Application Programming Interface) which receives an execution code (see FIG. 1) included in the image file having the decompression of JAR and which sends image data developed on the basis of the execution code to the OS 152.

In this manner, the self-developed image data (CCD-raw data→bitmap data) is subjected to the process items described in Table 1 by the platform independent execution environment region 156 and transferred to the OS 152.

Procedures depending on transfer of image data from the digital camera 10 (memory card 58) to the PC 120 and the type of the image data will be described below with reference to the flow charts shown in FIGS. 8 and 9.

Figure 8:
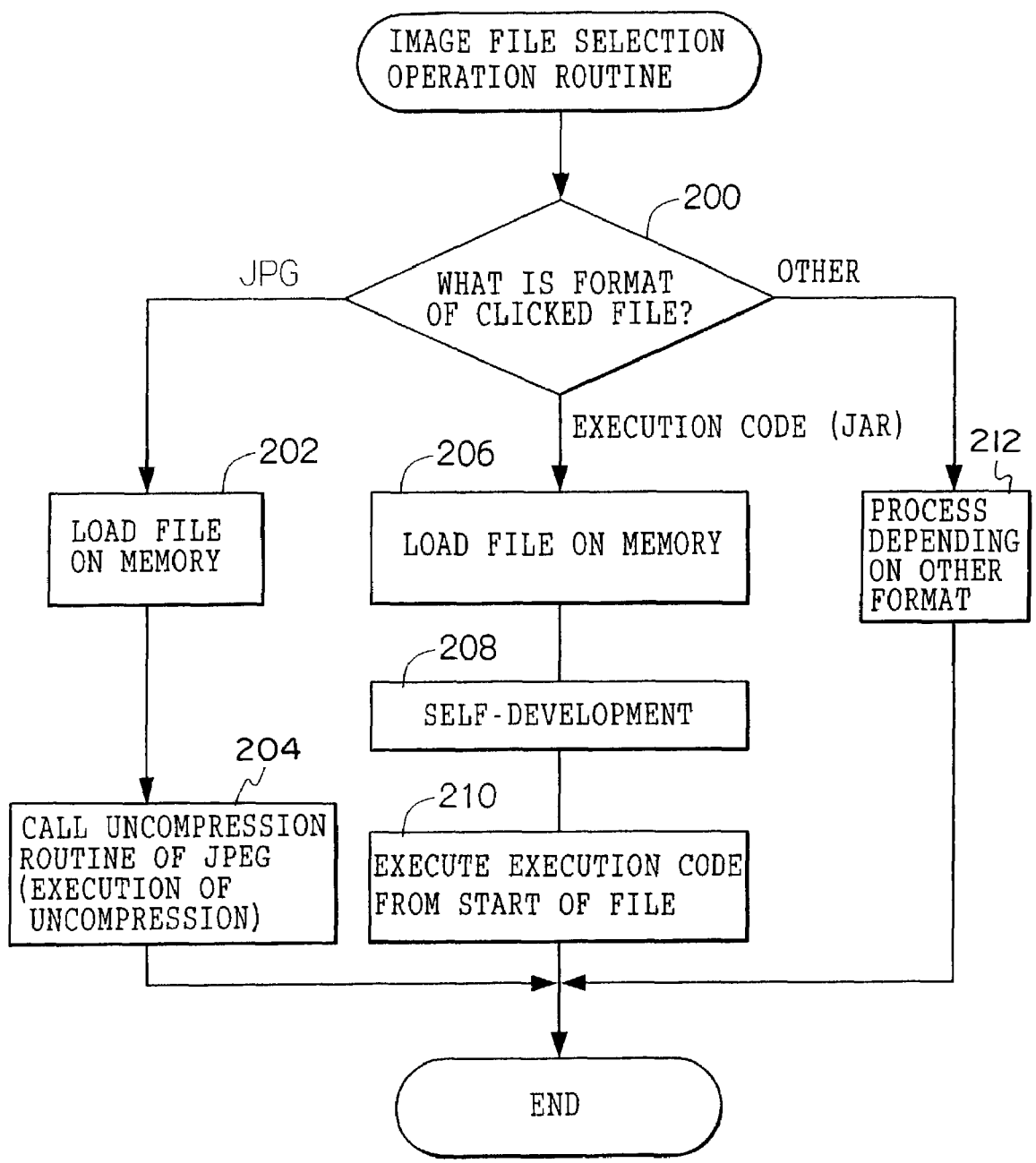
FIG. 8 is a control flow chart showing an image file selection operation process routine.

FIG. 8 shows processes executed when a selection operation (click operation) of any image file is performed in a state in which the image data recorded on the memory card 58 is displayed in a tree structure shown in FIG. 6. In step 200, the format of the file obtained by the selection operation (click operation) is decided.

It is decided in step 200 that the decompression is JPG, the Process shifts to step 202 to read JPEG data recorded on the image file into the nonvolatile memory 26, execute an decompression process in the compression/decompression unit 108, and transfer the expanded image file to the PC 120 through the external communication I/F 116.

In the next step 204, in the PC 120, a process is executed by using a viewer software corresponding to JPEG and installed in the PC 120 in advance.

In the next step 200, although not mentioned in the embodiment, when an image file format (hereinafter referred to as another file format) JPEG data and CCD-raw data is used, the process shifts from step 200 to step 212 to execute processes corresponding to the file format. As the other file format, BMP, TIFF, or the like are known.

On the other hand, in step 200, when the suffix of the format of the clicked image file is JAR, the Process shifts from step 200 to step 206.

In step 206, the CCD-raw data recorded in the image file is read to the nonvolatile memory 26, execute an decompression process in the compression/decompression unit 108, and transfer the expanded image file to the PC 120 through the external communication I/F 116. Since this process is a process performed in the digital camera 10, the process is executed to even CCD-raw data without any problem.

In the next step 208, in the self-development region 158 of the PC 120, a self-development operation is executed to convert the data into bitmap file data. In step 210, the execution code formed in the self-development module added to the CCD-raw data is executed to the image data converted into the bitmap file data in the platform independent execution environment region 156 having the API.

FIG. 9 shows procedures of an execution code in step 210 in FIG. 8. In step 220, a gamma value in an observing environment, i.e., a specification environment of a monitor display in the PC 120 is acquired by the API, and a gamma value used in reproduction is calculated in step 222.

The next 13 steps (from step 224 to step 248) for a process block shown in Table 1 include execution of the pixel rearrangement process, the defect correction process, the offset correction process, the gain correction process, the linear matrix process, the gamma correction process, the YC process, the LPF process, the resize process, the contour correction process, the color difference matrix process, the YC-RGB conversion process, and the trimming process.

In the next step 250, the processed image data is transferred to the OS 152. In this manner, in the PC 120, a reproducing process such as a monitor display process can be executed by the same process as that for versatile image data (bitmap data).

In the above description, all the process items are performed. However, when at least gamma correction is performed, drawbacks such as a toneless image, which directly affects image quality when a person visually checks it, can be solved (processes in steps 220, 222, 234, and 250 indicated by an arrow A).

As has been described above, in the embodiment, as a function of the digital camera 10, when an image recorded on the memory card 58 as CCD-raw data is reproduced in the PC 120, the self-development execution module is added to the image file in which the CCD-raw data is stored to make it possible that the CCD-raw data can be reproduced, i.e., displayed on the monitor of the PC 120 without a dedicated viewer for reproducing CCD-raw data in the PC 120. The self-development region 158 is formed in the platform independent execution environment region 156 on the platform of the PC 120. In this manner, the self-developed image data (CCD-raw data→bitmap data) can be subjected to processes such as a gamma correction process by the API of the platform independent execution environment region 156 and then transferred to the OS 152. The image data can be reproduced without forming a toneless image or the like.

What is claimed is:

1. A digital camera having an image pickup function, which picks up an image using a solid-state image pickup device and performs photoelectric conversion to obtain analog image data, and a digital image data recording function, which converts the analog image data to form digital image data and records the digital image data on a recording medium, the digital camera comprising:
   a raw image recording control component for recording the digital image data on the recording medium as unprocessed raw image data; and
   a self-development execution module adding component for adding a self-development execution module to the raw image data file on the recording medium that includes an instruction set that instructs an external control device to convert the raw image data into data of a bitmap file format,
   wherein the self-development execution module is independent of the external control device, and
   wherein said self-development execution module includes executable code that executes said instruction set.

2. The digital camera of claim 1, wherein the self-development execution module adding component further adds an observing condition when the raw image data is observed and then transmits the image.

3. The digital camera of claim 2, wherein the observing condition comprises tone.

4. The digital camera of claim 1, wherein the executable code defines processes for at least one of Pixel Rearrangement, Defect Correction, Offset Correction, Gain Correction, Linear Matrix, Gamma Correction, YC process, LPF process, Resize process, Contour Correction, Color Difference Matrix, YC-RGB Conversion, and Trimming Process.

5. The digital camera of claim 1, wherein the executable code defines processes for Pixel Rearrangement, Defect Correction, Offset Correction, Gain Correction, Linear Matrix, Gamma Correction, YC process, LPF process, Resize process, Contour Correction, Color Difference Matrix, YC-RGB Conversion, and Trimming Process.

6. The digital camera of claim 1, wherein the executable code defines a process for Gamma Correction.

7. An image data processing system comprising:
a digital camera having a normal image data recording mode, which converts image data of an object picked up using a solid-state image pickup device from analog to digital, performs a process such as compression of the digital data, and records the resultant data on a recording medium, and a raw image data recording mode, which records the raw image data obtained by the analog-digital conversion as is on the recording medium and adds a self-development execution module to a raw image data file on the record medium that includes an instruction set that instructs an external process control device to convert the raw image data into data of a bitmap file format when the raw image data is recorded on the recording medium,
wherein said external process control device, has an application programming interface for transferring an observing condition used when the raw image data is observed and transferring raw image data instructed to be developed by the self-development execution module, and which is further capable of communicating with the digital camera, and
wherein said self-development execution module includes executable code that executes said instruction set.

8. The image data processing system of claim 7, wherein the observing condition comprises tone.

9. The image data processing system of claim 7, wherein the self-development execution module is independent of the external control device, which develops image data.

10. An external control device, which displays image data picked up with a digital camera, further comprising:
an application programming interface, which transfers an observing condition when raw image data is observed between the digital camera and the external control device and transfers raw image data after it has been instructed to be developed by a self-development execution module between the digital camera and the external control device, wherein
the raw image data includes image data of an object picked up with a solid-state image pickup device of the digital camera and which has only been converted from analog to digital;
the self-development execution module is added to a raw image data file on the recording medium that includes an instruction set that instructs the external control device to convert the raw image data into data of a bitmap file format,
wherein said self-development execution module includes executable code that executes said instruction set.

11. The external control device of claim 10, wherein the digital camera further adds reproduction parameters to the raw image data for reproducing the raw image data and the external control device reproduces the raw image data based on the reproduction parameters.

12. The external control device of claim 10, wherein the self-development execution module is independent of the external control device.

13. An image recording method comprising:
converting data, which was picked up with a solid-state image pickup device of a digital camera, from analog to digital;
recording, to a recording medium, raw image data, which does not undergo any other processing; and
recording a self-development execution module to a raw image file on the recording medium that includes an instruction set that instructs an external control convert raw image data into data of a bitmap file format,
wherein said self-development execution module includes executable code that executes said instruction set.

14. The image recording method of claim 13,
wherein the self-development execution module is independent of an external control device, which develops image data.

15. An image control method, which controls an image that is recorded by the imago recording method of claim 13, the method comprising:
transferring an observing condition between the digital camera and the external control device when observing raw image data; and
transferring raw image data between the digital camera and the external control device after the raw image data has been developed by the self-development execution module.

* * * * *